United States Patent [19]

Chamberlain

[11] Patent Number: 5,008,136

[45] Date of Patent: Apr. 16, 1991

[54] TEMPERATURE INDICATING PAINT AND METHOD OF PREPARING A SPECIMEN WITH THE SAME

[75] Inventor: John R. Chamberlain, Bristol, England

[73] Assignee: Rolls Royce plc, London, England

[21] Appl. No.: 395,360

[22] Filed: Aug. 17, 1989

Related U.S. Application Data

[63] Continuation-in-part of Ser. No. 189,758, May 3, 1988, abandoned.

[30] Foreign Application Priority Data

May 19, 1987 [GB] United Kingdom ............... 8711815

[51] Int. Cl.$^5$ ............................................. B05D 3/02
[52] U.S. Cl. ................................ 427/388.1; 116/207; 252/408.1; 374/161; 374/162
[58] Field of Search ................... 116/207; 252/408.1; 374/159, 161, 162; 427/388.1

[56] References Cited

U.S. PATENT DOCUMENTS

| | | | |
|---|---|---|---|
| 3,684,737 | 8/1972 | Emigh | 252/408.1 |
| 3,948,811 | 4/1976 | Clary et al. | 252/512 |
| 4,251,275 | 2/1981 | Deffeyes et al. | 106/1.19 X |

Primary Examiner—Michael Lusignan
Attorney, Agent, or Firm—Oliff & Berridge

[57] ABSTRACT

A temperature indicating paint which is generally time independent comprises an organic resin, high temperature glass frit resin and one or more of the following elements; silver, gold, platinum, palladium, copper, nickel, chromium, titanium and silicon, dispersed in 10% to 70%, by weight, of a solvent. The paint is applied to a specimen by brushing or spraying and the specimen is then stoved for 5 minutes at between 750° C. and 850° C.

20 Claims, No Drawings

TEMPERATURE INDICATING PAINT AND METHOD OF PREPARING A SPECIMEN WITH THE SAME

This application is a continuation-in-part of application Ser. No. 189,758, filed May 3, 1988, now abandoned.

BACKGROUND OF THE INVENTION

1. Field of the Invention

This invention relates to temperature indicating paint and a method of preparing a specimen with the same.

2. Description of the Related Art

Coatings which change color or some other physical property at one or more known temperatures are a useful tool in the development of aero-engine components. Techniques which employ such thermal coatings have several advantages over other methods in that they are non-destructive, relatively low cost, and produce a temperature profile over the whole surface of a component, rather than just at discrete points as with thermocouples.

Temperature indicating paints, or thermal paints as they are also known, have shortcomings, one of which is that the color/physical changes are, to a varying degree, time dependent and to a lesser extent pressure dependent. The usual technique to overcome this problem is to temperature calibrate all multichange paints (which when subjected to a thermal gradient may reveal several permanent changes, each being assigned a temperature isotherm) at various times in the laboratory. However, temperature is not the only parameter affecting these changes, as other environmental conditions may also play a part.

To overcome the time dependent nature of known thermal paints, a datum coating can be applied to provide an isotherm on a component, under operating conditions, which has been previously demonstrated to be time and environmentally independent. The mechanism involved in the change to form the isotherm should be a function of temperature, and irrespective of the operating gas environment so that a datum isotherm can be allocated to the component with confidence regardless of running time or operating conditions. Ideally, at least three datum markers covering a suitable temperature range should be used for internal calibration of a multichange thermal paint.

Metal coatings have previously been used for internal datum markers utilizing silver, gold and gold/silver alloy. Gold and silver have been applied by electro-plating and gold/silver alloy by flame spraying. However, with particular reference to aero-engine development with components such as turbine blades, such coatings have been found unsatisfactory. The methods of application quoted above usually result in an average coating thickness of 25 microns to 30 microns for electro-plating and 50 microns to 75 microns for flame spraying. This amount of material has been known to cause problems when flowing in the molten state by blocking turbine blade cooling holes. These processes are also relatively costly and time consuming whilst requiring expensive equipment. When plating turbine blades with gold and silver, it is difficult adequately to mask off the leading and trailing edge cooling holes prior to plating. These masking difficulties result in silver and gold plate being missing from crucial areas and hence gaps will result in the data necessary to assess the blade temperature profile. Furthermore, the surface of a flame sprayed coating is extremely rough, causing both contamination and interpretation problems.

SUMMARY OF THE INVENTION

It has now been found that the use of a precious metal coating applied as a paint overcomes most or all of the disadvantages mentioned above.

According to the invention, a temperature indicating paint comprises a mixture of silver, inorganic glass frit and an organic resin, dispersed in 10% to 70%, by weight, of solvent.

Preferably the mixture contains one or more of the following elements:- gold, platinum, palladium, copper, nickel, chromium, titanium or silicon. The solvent may be 2-Ethoxyethyl Acetate or Xylene. The mixture may comprise a resin and binary alloy of silver and one of the following elements, namely, gold, copper, silicon, titanium, chromium or nickel.

The paint according to the invention preferably comprises 40-60% metal particle pigment, 5-15%, preferably about 10% inorganic glass frit high temperature binder, and the remainder organic resin binder.

According to another aspect of the invention, a method of preparing a specimen with a temperature indicating paint comprises the step of applying a temperature indicating paint which has a composition according to the present invention to a specimen by brush or by spraying.

Preferably, the specimen is stoved for up to 5 minutes at a temperature of between 750° C. and 850° C.

The invention allows for a minimum coating thickness required to give a uniform coverage, thereby reducing material costs and the problems encountered with flowing of excess molten metal. The method can be applied 'in house' using conventional techniques. Furthermore, elimination of masking around aerofoil cooling holes is no longer necessary and the improved surface finish over flame-sprayed silver/gold alloys allows the paint directly to relate to the underlying substrate.

The invention may be more fully understood with reference to the following discussion of specific embodiments. The invention is not limited to the exemplary embodiments but should be recognized as contemplating all modifications within the skill of an ordinary artisan.

DETAILED DESCRIPTION OF THE PREFERRED EMBODIMENTS

The invention will now be described by way of examples.

According to the invention, a thermal paint based on silver is applied to a component such as a turbine blade.

Preferred paint compositions include 40-60% silver, 3-5% lead borosilicate glass, 5-8% bismuth oxide, 0.5-2% cobalt oxide and 35-45% organic resin. Other materials, for example, borax (sodium borate) type glasses, may be used in place of lead borosilicate glass, and other materials, for example, other transition metals, may be used in place of bismuth oxide and cobalt oxide.

A specific example of a suitable paint consists of 64.5%, by weight, of a mixture of a silver pigment and high temperature glass frit resin in the form of a paste, and 35.5%, by weight, of Cellosolve Acetate (also known as 2-Ethoxyethyl Acetate) used as a solvent. Xylene can be used instead of Cellosolve Acetate. The ratio of solvent can vary between approximately 10 and 70%. This paint provides a medium thermal marker at 942±2° C. The silver paste is marketed by Johnson Mathey Chemicals for electrical capacitor and thermistor use, and a typical composition is:

| | |
|---|---|
| particulate silver | 50.0 |
| lead borosilicate glass flux | 3.3 |
| bismuth oxide | 6.7 |
| cobalt oxide | 1.0 |
| organic resin | 39.0 |

A high thermal marker paint utilizes a mixture in the form of silver/palladium paste to produce a marker at 1052±3° C. The paint consists of 67.6% by weight of a 6:1 Ag/Pd paste including a high temperature glass frit resin, and 32.4% by weight Cellosolve Acetate or Xylene. The ratio of silver to palladium can be varied to up to 50% palladium. However, a 6:1 Ag/Pd paste is commercially available from Englehard Ltd under the codename T13194. As above, the ratio of solvent to paste can be anything from 10-70%.

A further paint having a transition temperature of 977±2° C. consists of a mixture in the form of a silver/platinum paste in the ratio 20:1 including a high temperature glass flux resin, also available from Englehard Ltd under the code number T2786. The optimum ratio is 62.5%, by weight, of silver/platinum paste and 37.5% solvent. The ratio of silver to platinum may be varied to up to 30% platinum and, again, the ratio of paste to solvent may be varied to provide for between 10 and 70% solvent.

Other secondary elements such as gold (up to 99%), copper (up to 99%), silicon (up to 60%), titanium (up to 10%), chromium (up to 10%), and nickel (up to 2%) can be alloyed with silver to produce silver binary alloy pigmented paint systems.

After mixing with the solvent, the paint is sprayed or brushed on to the specimen. After air drying to remove the solvent, the specimen is stoved for 5 minutes at 750° C. to 850° C. to produce a specular finish. Stoving is required to bond the paint film to the substrate; otherwise it has no toughness and can be easily damaged by handling. Exceptionally, stoving may be carried out at 300° C. for one hour but this is not recommended due to the friable nature of the coating at this temperature. The stoving removes the organic resin constituents of the paint. The organic resin is required to give the paint green strength during application to the substrate, but after stoving plays no part in the final performance of the paint in its ability as a thermal marker; this function is performed by the inorganic glass frit which acts as a binder for the silver.

A major advantage of thermal datum markers based on metallic alloys is the conductivity of the paint/coating matrix. Thus, silver as a primary alloy has the advantage of excellent conductivity whereas standard thermal paints are insulators. A major use for the paints described above is as single change paints in their own right as well as thermal datum markers. The metallic paint reveals a more representative picture of surface thermal mechanisms, for instance the ability of a turbine blade to dissipate heat. Silver also has a convenient melting point of 960° C. and is commercially available as well as having excellent conductivity. Gold, although having similar advantages to silver, will diffuse into a nickel based alloy specimen.

It is recognized that the ideal thermal marker will be a eutectic alloy to ensure a rapid change from solidus to liquidus. However, commercially available eutectic alloys with melting points in the desired temperature ranges are practically impossible to obtain in the form required for paint manufacture. There is no eutectic mixture formed with silver/palladium and silver/gold alloy. In any case, only a physical change observable by the human eye is necessary and in these cases the first definite change from a specular finish achieved on stoving is all that is necessary to allocate an isotherm.

All percentages are by reference to weight in this specification.

Although the paints in accordance with the present invention have been described in connection with preferred embodiments, it will be appreciated by those skilled in the art that additions, modifications, substitutions and deletions not specifically described may be made without departing from the spirit and scope of the invention defined in the appended claims.

What is claimed is:

1. A temperature indicating paint comprising a silver containing paste dispersed in 10% to 70% by weight of a volatile solvent, the paste comprising:
   (a) 50-60% by weight of a metal particle pigment, at least a proportion of which is silver,
   (b) 10-12% by weight of a chemically stable glass frit binder that is essentially non-volatile to a temperature of at least 1100° C., and
   (c) an organic binder, being the remainder of the paste, volatile at a temperature less than 750° C.

2. A paint as claimed in claim 1 wherein the proportion of solvent in the paint is between 32.4% and 37.5% by weight.

3. A paint as claimed in claim 1 wherein the glass frit binder comprises a borosilicate glass flux and at least one metal oxide.

4. A paint as claimed in claim 3 wherein the glass flux is lead borosilicate and at least one metal oxide is a mixture of bismuth oxide and cobalt oxide.

5. A paint as claimed in claim 1 wherein the solvent is 2-ethoxyethyl acetate.

6. A paint as claimed in claim 1 wherein the solvent is xylene.

7. A paint as claimed in claim 1 wherein the pigment includes at least one element selected from the group consisting of palladium and platinum.

8. A paint as claimed in claim 7 wherein said selected element is palladium.

9. A paint as claimed in claim 8 wherein the ratio of silver to palladium is at least 1:1 by weight.

10. A paint as claimed in claim 9 wherein the ratio of silver to palladium is 6:1 by weight.

11. A paint as claimed in claim 7 wherein said selected element is platinum.

12. A paint as claimed in claim 11 wherein the ratio of silver to platinum is at least 7:3 by weight.

13. A paint as claimed in claim 1 wherein the pigment includes at least one element selected from the group consisting of gold, copper, silicon, titanium, chromium or nickel.

14. A paint as claimed in claim 13 wherein the silver is in the form of a binary alloy with a said selected element.

15. A paint as claimed in claim 8 wherein the paint contains 32.4% by weight of solvent.

16. A paint as claimed in claim 11 wherein the paint contains 37.5% by weight of solvent.

17. A paint as claimed in claim 1 wherein the glass frit binder comprises a borax type glass and at least one metal oxide.

18. A paint as claimed in claim 17 wherein the at least one metal oxide is a mixture of transition metal oxides.

19. A method of preparing a part of a gas turbine engine with a temperature indicating paint comprising the steps of applying to the part a temperature indicating paint comprising a silver containing paste dispersed in 10% to 70% by weight of a volatile solvent, the paste comprising:
   (a) 50–60% by weight of a metal particle pigment, at least a proportion of which is silver,
   (b) 10–12% by weight of a chemically stable glass frit binder that is essentially non-volatile to a temperature of at least 1100° C., and
   (c) an organic binder, being the remainder of the paste, volatile at a temperature less than 750° C., permitting the solvent to volatile, and stoving the part for up to five minutes at a temperature of between 750° C. and 850° C. so as to burn off the organic binder.

20. A method of preparing a part of a gas turbine engine with a temperature indicating paint comprising the steps of applying to the part a temperature indicating paint comprising a silver containing paste dispersed in 10% to 70% by weight of a volatile solvent, the paste comprising:
   (a) 50–60% by weight of a metal particle pigment, at least a proportion of which is silver,
   (b) 10–12% by weight of a chemically stable glass frit binder that is essentially non-volatile to a temperature of at least 1100° C., and
   (c) an organic binder, being the remainder of the paste, volatile at a temperature less than 750° C., permitting the solvent to volatilize, and stoving the part for up to one hour at a temperature of about 300° C. so as to burn off the organic binder.

* * * * *